United States Patent
Maruyama et al.

(10) Patent No.: US 9,080,502 B2
(45) Date of Patent: Jul. 14, 2015

(54) ENGINE WITH VARIABLE VALVE MECHANISM

(75) Inventors: Keiji Maruyama, Hiroshima (JP); Takayuki Yamaguchi, Hiroshima (JP); Kentaro Takaki, Hiroshima (JP); Yuji Matsuo, Hiroshima (JP); Toshiyuki Kojima, Tokyo (JP); Hiroyuki Jinno, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 168 days.

(21) Appl. No.: 13/807,639

(22) PCT Filed: Jun. 10, 2011

(86) PCT No.: PCT/JP2011/003296
§ 371 (c)(1),
(2), (4) Date: Dec. 28, 2012

(87) PCT Pub. No.: WO2012/001888
PCT Pub. Date: Jan. 5, 2012

(65) Prior Publication Data
US 2013/0104540 A1    May 2, 2013

(30) Foreign Application Priority Data

Jun. 30, 2010  (JP) ................................. 2010-148595

(51) Int. Cl.
*F02B 33/00* (2006.01)
*F01L 1/34* (2006.01)
(Continued)

(52) U.S. Cl.
CPC ............... *F02B 33/00* (2013.01); *F02B 37/004* (2013.01); *F02B 37/013* (2013.01);
(Continued)

(58) Field of Classification Search
CPC .... F02B 37/013; F02B 37/127; F02B 37/004; F02B 33/00; F02B 37/183; F02B 2275/14; F02D 13/0207; F02D 13/0273; F02D 41/006; F02D 2250/34; F02D 41/0007; F02D 41/1497; F02M 25/0711; F02M 25/0713; F02M 25/0728; F02M 25/0731; F01L 1/267; F01L 2001/0537; F01L 2009/0492; F01L 2800/06; Y02T 10/18; Y02T 10/144; Y02T 10/47; F01N 3/035
USPC ............... 123/90.15, 90.17, 564; 60/600–603
See application file for complete search history.

(56) References Cited

U.S. PATENT DOCUMENTS

2008/0216780 A1* 9/2008 Nakamura ................. 123/90.15
2009/0050118 A1* 2/2009 Delp et al. ................. 123/559.2
(Continued)

FOREIGN PATENT DOCUMENTS

JP     03-117611 A    5/1991
JP     2000-186517 A  7/2000
(Continued)

OTHER PUBLICATIONS

International Search Report; PCT/JP2011/003296; Jul. 19, 2011.

*Primary Examiner* — Thai Ba Trieu
*Assistant Examiner* — Jason Newton
(74) *Attorney, Agent, or Firm* — Studebaker & Brackett PC

(57) ABSTRACT

An engine includes a variable valve mechanism capable of switching a valve characteristic to a first valve characteristic according to which at least one of an operation of pre-opening an intake valve during an exhaust stroke prior to a valve opening time in an intake stroke and an operation of re-opening an exhaust valve during the intake stroke subsequently to the opening/closing thereof during the exhaust stroke is performed, and to a second valve characteristic according to which neither the pre-opening of the intake valve nor the re-opening of the exhaust valve is performed. In the engine, when the valve characteristic is the first valve characteristic, if the presence of a request for switching to the second valve characteristic resulting from an increase in engine load is detected, a pressure reducing operation for reducing the pressure in an exhaust passage of the engine is performed.

4 Claims, 4 Drawing Sheets

(51) Int. Cl.

| | | |
|---|---|---|
| *F02B 37/013* | (2006.01) | |
| *F02B 37/12* | (2006.01) | |
| *F02D 13/02* | (2006.01) | |
| *F02B 37/00* | (2006.01) | |
| F01L 1/053 | (2006.01) | |
| F01N 3/035 | (2006.01) | |
| F02B 37/18 | (2006.01) | |
| F02D 41/00 | (2006.01) | |
| F02D 41/14 | (2006.01) | |
| F02M 25/07 | (2006.01) | |

(52) U.S. Cl.
CPC ......... *F02B 37/127* (2013.01); *F02D 13/0207* (2013.01); *F02D 13/0273* (2013.01); *F02D 41/006* (2013.01); F01L 2001/0537 (2013.01); F01N 3/035 (2013.01); F02B 37/183 (2013.01); F02B 2275/14 (2013.01); F02D 41/0007 (2013.01); F02D 41/1497 (2013.01); F02D 2250/34 (2013.01); F02M 25/0711 (2013.01); F02M 25/0713 (2013.01); F02M 25/0728 (2013.01); F02M 25/0731 (2013.01); Y02T 10/144 (2013.01); Y02T 10/18 (2013.01); Y02T 10/47 (2013.01)

(56) References Cited

U.S. PATENT DOCUMENTS

| | | | |
|---|---|---|---|
| 2009/0050119 A1* | 2/2009 | Inoue | 123/564 |
| 2010/0186406 A1* | 7/2010 | Kaneko | 60/602 |
| 2011/0041493 A1* | 2/2011 | Doering et al. | 60/603 |
| 2011/0073069 A1* | 3/2011 | Marriott et al. | 123/406.12 |
| 2014/0298802 A1* | 10/2014 | Suzuki et al. | 60/602 |

FOREIGN PATENT DOCUMENTS

| | | |
|---|---|---|
| JP | 2004-176568 A | 6/2004 |
| JP | 2009-103084 A | 5/2009 |
| JP | 2009-191737 A | 8/2009 |

\* cited by examiner

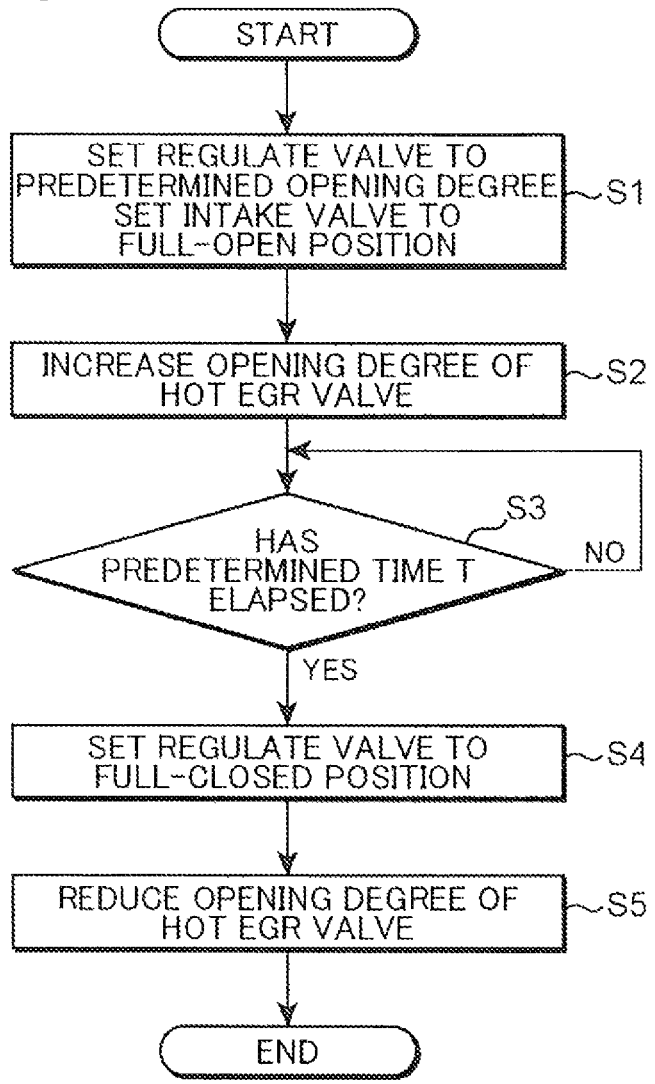

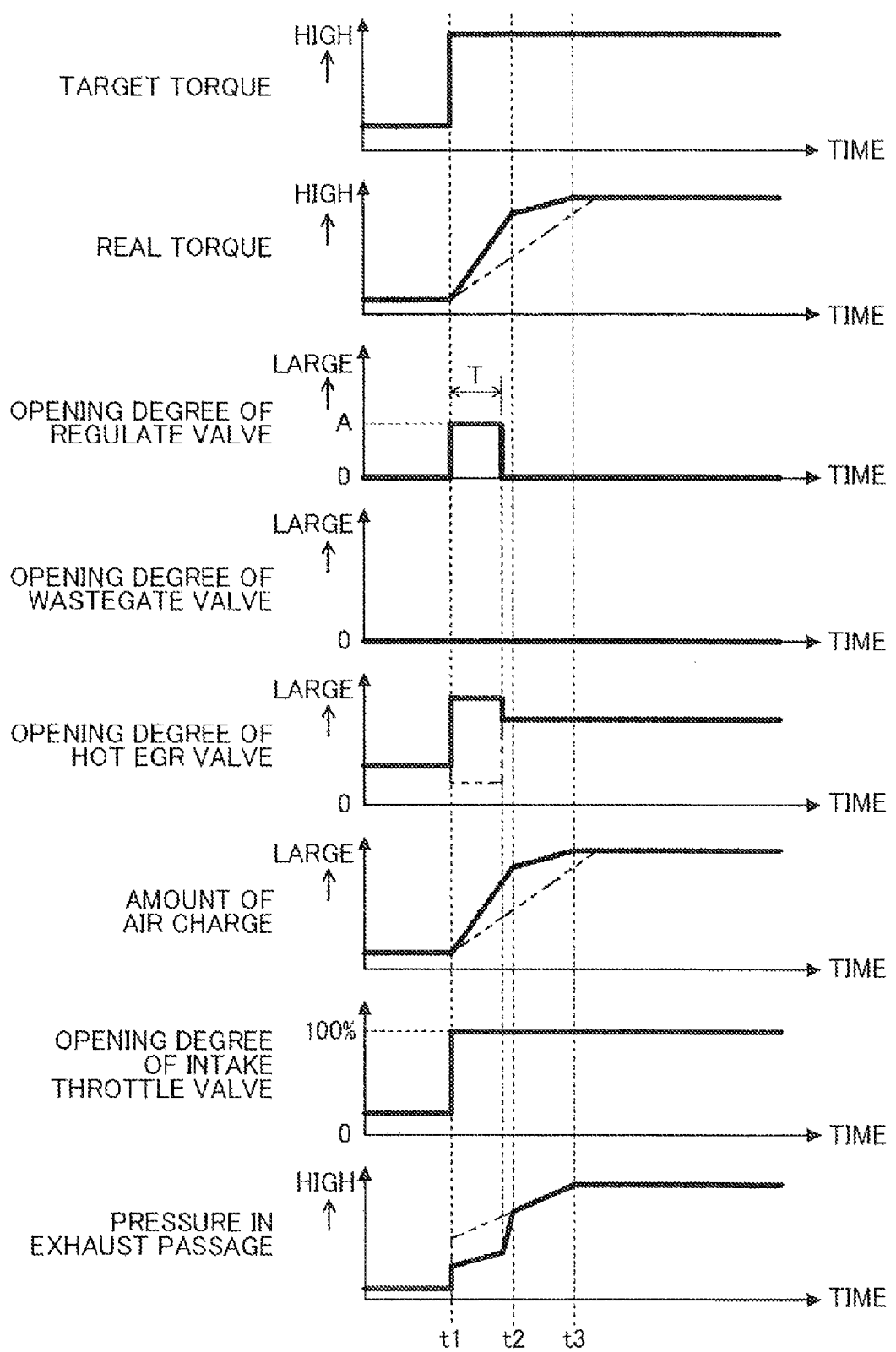

ENGINE WITH VARIABLE VALVE MECHANISM

TECHNICAL FIELD

The present invention relates to a technical field concerning an engine including a variable valve mechanism capable of switching a valve characteristic to a first valve characteristic according to which at least one of an operation of pre-opening an intake valve during an exhaust stroke prior to a valve opening time in an intake stroke and an operation of re-opening an exhaust valve during the intake stroke subsequently to the opening/closing thereof during the exhaust stroke is performed, and to a second valve characteristic according to which neither the pre-opening of the intake valve nor the re-opening of the exhaust valve is performed.

BACKGROUND ART

Conventionally, as shown in, e.g., Patent Document 1, an engine has been known in which, for the purpose of improving combustion or the like, an exhaust valve is opened (re-opened) during an intake stroke subsequently to the opening/closing thereof during an exhaust stroke to thereby introduce burnt gas (exhaust gas) in an exhaust passage as internal EGR gas into a cylinder. Also, in Patent Document 1, it is disclosed to open (pre-open) an intake valve during the exhaust stroke to introduce the burnt gas into an intake passage and to introduce the burnt gas, together with fresh air, as the internal EGR gas into the cylinder in the next intake stroke. Such an engine includes a variable valve mechanism capable of switching a valve characteristic to a first valve characteristic which allows the intake valve to be pre-opened during the exhaust stroke prior to a valve opening time in the intake stroke or allows the exhaust valve to be re-opened during the intake stroke subsequently to the opening/closing thereof during the exhaust stroke, and to a second valve characteristic which allows neither the pre-opening of the intake valve nor the re-opening of the exhaust valve to be performed.

CITATION LIST

Patent Literature

[PTL 1]
Patent Document 1: Japanese Patent Application Laid-open No. 2000-186517

SUMMARY OF INVENTION

Technical Problem

In the above engine, when the operating state of the engine is in a low-rotation and low-load operation region, the valve characteristic provided by the variable valve mechanism is normally set to the first valve characteristic. On the other hand, in a high-load operation region or the like which requires a large amount of fresh air, the valve characteristic is set to the second valve characteristic.

However, when the valve characteristic is switched from the first valve characteristic to the second valve characteristic as a result of an increase in engine load, actuation delay of a cam or the like in the switching operation delays a reduction in internal EGR amount to result in the problem of a delayed increase in the amount of fresh air to be charged into the cylinder. Such a delayed increase in the amount of fresh air leads to the degradation of response to an acceleration request particularly when the level of acceleration requested of the engine is higher than a predetermined value.

The present invention has been achieved in view of such points, and an object thereof is to increase, when the valve characteristic is switched from the first valve characteristic to the second valve characteristic as a result of an increase in engine load, the amount of fresh air charged into the cylinder at the earliest possible time.

Solution to Problem

To attain the above object, the present invention provides a control device intended for an engine including a variable valve mechanism capable of switching a valve characteristic to a first valve characteristic according to which at least one of an operation of pre-opening an intake valve during an exhaust stroke prior to a valve opening time in an intake stroke and an operation of re-opening an exhaust valve during the intake stroke subsequently to the opening/closing thereof during the exhaust stroke is performed, and to a second valve characteristic according to which neither the pre-opening of the intake valve nor the re-opening of the exhaust valve is performed. The control device includes: a switch request detecting unit for detecting, when the valve characteristic provided by the variable valve mechanism is the first valve characteristic, the presence or absence of a request for switching to the second valve characteristic resulting from an increase in engine load; a fuel amount increasing unit for increasing, when the presence of the switch request is detected by the switch request detecting unit, an amount of fuel supplied to the engine to an amount larger than when the first valve characteristic is selected; a valve characteristic switching unit for switching, when the presence of the switch request is detected by the switch request detecting unit, the valve characteristic provided by the variable valve mechanism from the first valve characteristic to the second valve characteristic; and an exhaust pressure reducing unit for performing, when the presence of the switch request is detected by the switch request detecting unit, a pressure reducing operation for reducing a pressure in an exhaust passage of the engine.

Advantageous Effects of Invention

As described above, according to the engine control device of the present invention, when the valve characteristic is switched from the first valve characteristic to the second valve characteristic, the amount of fresh air charged into the cylinder can be increased at an early time and, particularly at the time of an acceleration request, response to the acceleration request can be improved.

BRIEF DESCRIPTION OF DRAWINGS

FIG. 4 is a flow chart showing how an intake throttle valve, a hot EGR valve, the regulate valve, and a wastegate valve are controlled by a control unit when the valve characteristic provided by a variable valve mechanism is the first valve characteristic and when there is a request for switching to the second valve characteristic as a result of an increase in engine load.

FIG. 5 is a timing chart showing the respective operations of the intake throttle valve, the hot EGR valve, the regulate valve, and the wastegate valve based on control by the control unit and variations in target torque, real torque, amount of air charge, and pressure in the exhaust passage.

DESCRIPTION OF EMBODIMENTS

Based on the drawings, an embodiment of the present invention will be described below in detail.

Figure 1:
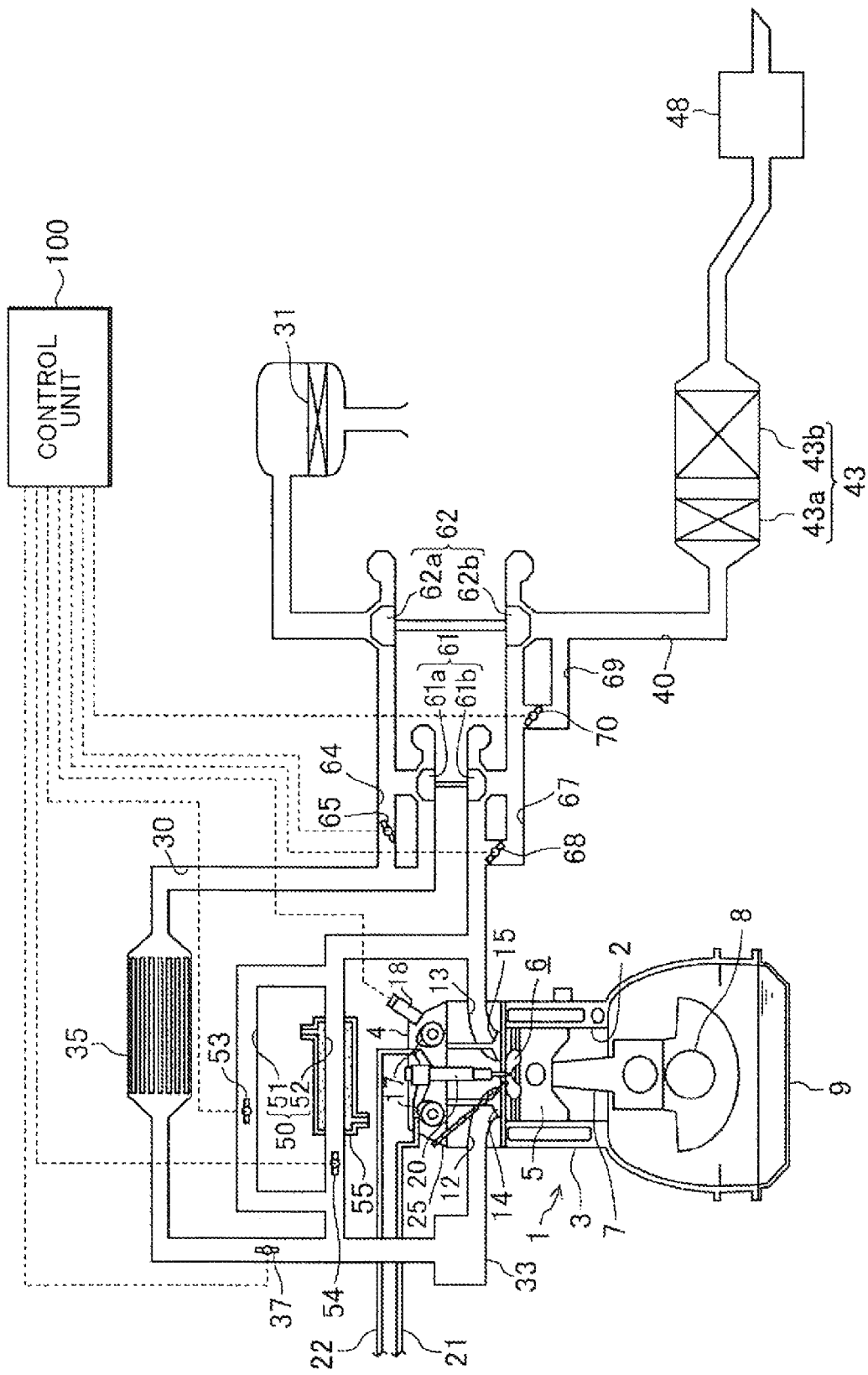
FIG. 1 is view showing a schematic structure of an engine control device according to an embodiment of the present invention.

FIG. 1 shows a schematic structure of a control device for an engine 1 according to the embodiment of the present invention. The engine 1 is a Diesel engine mounted on a vehicle, and has a cylinder block 3 provided with a plurality of cylinders 2 (of which only one is shown), a cylinder head 4 disposed above the cylinder block 3, and an oil pan 9 disposed below the cylinder block 3 and storing therein a lubricant. In each of the cylinders 2 of the engine 1, a piston 5 is inserted to be reciprocally movable and, in the top surface of the piston 5, a toroidal combustion chamber 6 is formed. The piston 5 is coupled to a crank shaft 8 via a con rod 7.

In the cylinder head 4, for each of the cylinders 2, an intake port 12 and an exhaust port 13 are formed. The intake port 12 is opened in the surface (lower surface) of the cylinder head 4 closer to the combustion chamber 6 and in one side surface (intake-side side surface) of the cylinder head 4, while the exhaust port 13 is opened in the surface of the cylinder head 4 closer to the combustion chamber 6 and in the other side surface (exhaust-side side surface) of the cylinder head 4.

In the cylinder head 4, an intake valve 14 and an exhaust valve 15 which open/close the respective openings of the intake port 12 and the exhaust port 13 closer to the combustion chamber 6 are each disposed. The intake valve 14 and the exhaust valve 15 are driven by a valve drive mechanism 17 to open/close the respective openings of the intake port 12 and the exhaust port 13 closer to the combustion chamber 6.

In the cylinder head 4, there are also provided an injector 20 for injecting fuel, and a glow plug 25 for warming intake air when the engine 1 is cool to enhance the ignition property of the fuel. The injector 20 is disposed such that the fuel injection hole thereof faces the combustion chamber 6 from the ceiling surface of the combustion chamber 6, and designed to directly inject (supply) the fuel into the combustion chamber 6 in the vicinity of a top dead centre in a compression stroke. Note that the injector 20 is coupled to a common rail not shown via a fuel supply pipe 21 so that the fuel is supplied from a fuel tank not shown to the injector 20 via the fuel supply pipe 21 and the common rail. The surplus fuel is returned to the fuel tank through a return pipe 22.

To the one side surface (intake-side surface) of the cylinder head 4, an intake passage 30 is connected so as to communicate with the intake port 12 of each of the cylinders 2. In the upstream end portion of the intake passage 30, an air cleaner 31 for filtering the intake air is disposed, and the intake air filtered by the air cleaner 31 is supplied into each of the cylinders 2 via the intake passage 30 and the intake port 12. In the intake passage 30, in the vicinity of the downstream end thereof, a surge tank 33 is disposed. The intake passage 30 on the side downstream of the surge tank 33 is provided as independent passages which are branched correspondingly to the individual cylinders 2, and the respective downstream ends of the independent passages are connected to the respective intake ports 12 of the cylinders 2.

Between the air cleaner 31 and the surge tank 33 in the intake passage 30, a compressor 61a of a first exhaust turbo-supercharger 61 and a compressor 62a of a second exhaust turbo-supercharger 62 are disposed. The compressor 61a of the first exhaust turbo-supercharger 61 is located downstream of the compressor 62a of the second exhaust turbo-supercharger 62. By the operation of the two compressors 61a and 62a, the intake air is supercharged. To the intake passage 30, an intake bypass passage 64 bypassing the compressor 61a of the first exhaust turbo-supercharger 61 is connected and, in the intake bypass passage 64, an intake bypass valve 65 for adjusting the amount of air flowing to the intake bypass passage 64 is disposed. Note that, in the present embodiment, a bypass passage bypassing the compressor 62a of the second exhaust turbo-supercharger 62 is not provided, but it may also be possible to provide such a bypass passage, and provide the same valve as the intake bypass valve 65 in the bypass passage.

Additionally, between the compressor 61a of the first exhaust turbo-supercharger 61 and the surge tank 33 in the intake passage 30, an intercooler 35 for cooling the air compressed by the two compressors 61a and 62a and an intake throttle valve 37 for adjusting the amount of intake air into the combustion chamber 6 of each of the cylinders 2 are successively arranged in upstream-to-downstream order.

To the other side surface (exhaust-side side surface) of the cylinder head 4, an exhaust passage 40 for exhausting burnt gas (exhaust gas) from each of the cylinders 2 is connected. The upstream portion of the exhaust passage 40 is formed of an exhaust manifold having independent passages which are branched correspondingly to the individual cylinders 2 to have the upstream ends thereof connected to the exhaust port 13 and a united portion in which the respective downstream ends of the independent passages are united. In the exhaust passage 40 on the side downstream of the exhaust manifold, a turbine 61b of the first exhaust turbo-supercharger 61 and a turbine 62b of the second exhaust turbo-supercharger 62 are disposed, and the turbine 61b of the first exhaust turbo-supercharger 61 is located upstream of the turbine 62b of the second exhaust turbo-supercharger 62. The turbines 61b and 62b are rotated by an exhaust gas flow and, by the rotation of the turbines 61b and 62b, the compressors 61a and 62a coupled to the respective turbines 61b and 62b are operated.

The first exhaust turbo-supercharger 61 is small-sized, while the second exhaust turbo-supercharger 62 is large-sized. That is, the turbine 61b of the first exhaust turbo-supercharger 61 has inertia smaller than that of the turbine 62b of the second exhaust turbo-supercharger 62, and thereby rotates at higher speed.

To the exhaust passage 40, a first exhaust bypass passage 67 bypassing the turbine 61b of the first exhaust turbo-supercharger 61 and a second exhaust bypass passage 69 bypassing the turbine 62b of the second exhaust turbo-supercharger 62 are connected. In the first exhaust bypass passage 67, a regulate valve 68 (first exhaust bypass valve) for adjusting the amount of exhaust flowing to the first exhaust bypass passage 67 is disposed. In the second exhaust bypass passage 69, a wastegate valve 70 (second exhaust bypass valve) for adjusting an amount of exhaust flowing to the second exhaust bypass passage 69 is disposed.

In the exhaust passage 40, on the side downstream of the turbine 62b of the second exhaust turbo-supercharger 62, an exhaust purifier 43 for purging a toxic component in the exhaust gas is disposed. The exhaust purifier 43 includes an upstream oxidation catalyst unit 43a and a downstream Diesel particulate filter 43b. In the downstream end portion (downstream of the exhaust purifier 43) of the exhaust passage 40, a silencer 48 is provided.

The portion (i.e., the portion downstream of the compressor 61a of the first exhaust turbo-supercharger 61) of the intake passage 30 interposed between the surge tank 33 and the intake throttle valve 37 is connected to the portion (i.e., the portion upstream of the turbine 61b of the first exhaust turbo-supercharger 61) of the exhaust passage 40 interposed between the exhaust manifold and the turbine 61b of the first exhaust turbo-supercharger 61 via an EGR passage 50 for recirculating a part of the exhaust gas to the intake passage 30. The EGR passage 50 includes a hot EGR passage 51 for recirculating high-temperature exhaust gas, without cooling it, as external EGR gas to the intake passage 30 and a cold EGR passage 52 for recirculating relatively-low-temperature exhaust gas (exhaust gas cooled by an EGR cooler 55, which will be described later, to a low temperature) as the external EGR gas to the intake passage 30. In the hot EGR passage 51 and the cold EGR passage 52, a hot EGR valve 53 and a cold EGR valve 54 each for adjusting the amount of recirculation to the intake passage 30 via the corresponding passage are respectively disposed. Also in the cold EGR passage 52, an EGR cooler 55 for cooling the exhaust gas with engine cooling water is disposed.

In the valve drive mechanism 17, a variable valve mechanism 18 is provided which is capable of switching a valve characteristic to a first valve characteristic selected when an operation (internal EGR) of introducing the burnt gas (exhaust gas) in the exhaust passage 40 into the cylinder 2, and to a second valve characteristic selected when the internal EGR is halted. Specifically, when the first valve characteristic is selected, the variable valve mechanism 18 performs at least one of an operation of opening (pre-opening) the intake valve 14 during an exhaust stroke prior to a valve opening time in an intake stroke and an operation of opening (re-opening) the exhaust valve 15 during the intake stroke subsequently to the opening/closing thereof during the exhaust stroke. On the other hand, when the second valve characteristic is selected, the variable valve mechanism 18 allows neither the pre-opening of the intake valve 14 nor the re-opening of the exhaust valve 15 to be performed.

In the present embodiment, the first valve characteristic is a characteristic which allows the exhaust valve 15 to be re-opened during the intake stroke subsequently to the opening/closing thereof during the exhaust stroke, and the second valve characteristic is a characteristic which does not allow the re-opening of the exhaust valve 15 to be performed during the intake stroke. That is, according to the first valve characteristic, the exhaust valve 15 is operated to be opened/closed together with the intake valve 14 during the intake stroke while, in a compression and expansion stroke, the intake valve 14 and the exhaust valve 15 are maintained in a closed state and, in the exhaust stroke, only the exhaust valve 15 is operated to be opened/closed (the intake valve 14 is maintained in the closed state without being operated to be opened/closed). On the other hand, the second valve characteristic is a normal valve characteristic and, according to the characteristic, only the intake valve 14 is operated to be opened/closed during the intake stroke (the exhaust valve 15 is maintained in the closed state without being operated to be opened/closed) while, in the compression and expansion stroke, the intake valve 14 and the exhaust valve 15 are maintained in the closed state and, in the exhaust stroke, only the exhaust valve 15 is operated to be opened/closed (the intake valve 14 is maintained in the closed state without being operated to be opened/closed). According to the first valve characteristic, the burnt gas (exhaust gas) in the exhaust passage 40 flows backward in an upstream direction upon the re-opening of the exhaust valve 15 during the intake stroke to be introduced as internal EGR gas into each of the cylinders 2. The amount of lift of the exhaust valve 15 during the intake stroke according to the first valve characteristic is smaller than the amount of lift of the intake valve 14. This is because an excessive increase in internal EGR amount results in a reduction in the amount of fresh air, an increase in smoke, and the like. The internal EGR amount according to the first valve characteristic is adjusted by changing the pressure difference between the exhaust passage 40 and the intake passage 30 using the opening degree of the intake throttle valve 37.

Note that the first valve characteristic may also be a characteristic which allows the intake valve 14 to be pre-opened during the exhaust stroke prior to the valve opening time in the intake stroke, and the second valve characteristic may also be a characteristic which does not allow the pre-opening of the intake valve 14 to be performed during the exhaust stroke. In this case, according to the first valve characteristic, only the intake valve 14 is operated to be opened/closed during the intake stroke (the exhaust valve 15 is maintained in the closed state without being operated to be opened/closed) while, in the compression and expansion stroke, the intake valve 14 and the exhaust valve 15 are maintained in the closed state and, in the exhaust stroke, the intake valve 14 is operated to be opened/closed together with the exhaust valve 15. On the other hand, the second valve characteristic is a normal valve characteristic and, according to the second valve characteristic, only the intake valve 14 is operated to be opened/closed during the intake stroke (the exhaust valve 15 is maintained in the closed state without being operated to be opened/closed) while, in the compression and expansion stroke, the intake valve 14 and the exhaust valve 15 are maintained in the closed state and, in the exhaust stroke, only the exhaust valve 15 is operated to be opened/closed (the intake valve 14 is maintained in the closed state without being operated to be opened/closed). In this case, according to the first valve characteristic, the opening of the intake valve 14 during the exhaust stroke allows the burnt gas to be introduced into the intake passage 30 (independent passages) and, in the next intake stroke, the burnt gas is introduced, together with fresh air, as the internal EGR gas into each of the cylinders 2.

Otherwise, it may also be possible that the first valve characteristic is a characteristic which allows the intake valve 14 to be pre-opened during the exhaust stroke prior to the valve opening time in the intake stroke, and also allows the exhaust valve 15 to be re-opened during the intake stroke subsequently to the opening/closing thereof during the exhaust stroke, and the second valve characteristic is a normal valve characteristic which does not allow the pre-opening of the intake valve 14 to be performed during the exhaust stroke, and also does not allow the re-opening of the exhaust valve 15 to be performed during the intake stroke.

A specific structure of the variable valve mechanism 18 is omitted here, but the structure described in Patent Document 1 mentioned above or the like can be used. In this case, by a predetermined switching actuator, the variable valve mechanism 18 is driven and, consequently, the valve characteristic is switched to the first valve characteristic or the second valve characteristic.

The engine 1 is controlled by a control unit 100. The intake throttle 37, the hot EGR valve 53, the cold EGR valve 54, the intake bypass valve 65, the regulate valve 68, and the wastegate valve 70 each described above are driven by the actuator. The operations of the actuator and the above switching actuator are controlled by the control unit 100.

The control unit 100 is a controller based on a known microcomputer, and includes a central processing unit (CPU) for executing a program, a memory formed of, e.g., a RAM or ROM and storing therein the program and data, and an input/output (I/O) bus for performing input/output of an electric signal.

Figure 2:
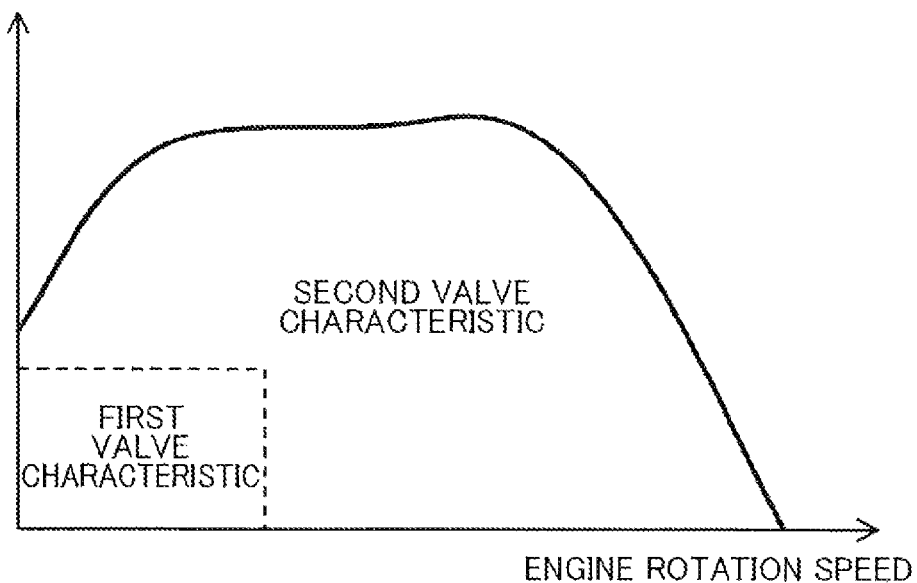
FIG. 2 is a view showing a control map for switching between a first valve characteristic and a second valve characteristic.

The control unit 100 controls the switching actuator based on a control map as shown in FIG. 2 so as to effect switching between the first valve characteristic and the second valve characteristic. That is, when the operating state of the engine 1 is in a predetermined operation region (hereinafter referred to as a first operation region), the first valve characteristic is selected and, when the operating state of the engine 1 is in an operation region (hereinafter referred to as a second operation region) other than the predetermined operation region, the second valve characteristic is selected. The first operation region is a low-rotation and low-load operation region (particularly preferred is an operation region which is low in rotation and low in load during an engine cold period when an engine water temperature is not more than a predetermined value) which is set in advance in the control map, and the second operation region is an operation region which is higher in rotation or higher in load than the first operation region.

Specifically, the control unit 100 determines a required torque (target torque) based on an accelerator opening degree from an accelerator opening degree sensor not shown, an engine rotation speed from an engine rotation speed sensor not shown, or the like, and calculates an amount of fuel injection, an engine load, and the like based on the required torque and the engine rotation speed. Then, the control unit 100 determines an operation region corresponding to the values of the engine load and the engine rotation speed based on the control map. When the determined operation region is the first operation region, the first valve characteristic is selected and, when the determined operation region is the second operation region, the second valve characteristic is selected. When the valve characteristic is the first valve characteristic and when the determined operation region mentioned above is the second operation region, it follows that there is a request for switching to the second valve characteristic.

The control unit 100 detects, when the valve characteristic is the first characteristic, the presence or absence of a request for switching to the second valve characteristic resulting from an increase in engine load. That is, the control unit 100 detects, when the engine is operated in the first operation region in the control map, whether or not the engine load increases from the state to shift the operating state of the engine to a position within the second operation region. On detecting the presence of the switch request, the control unit 100 increases the amount of the fuel supplied by the injector 20 to the combustion chamber 6 to an amount larger than when the first valve characteristic is selected, while activating the switching actuator so as to switch the valve characteristic from the first valve characteristic to the second valve characteristic, and further performs a pressure reducing operation for reducing the pressure in the exhaust passage 40 (pressure on the side upstream of the turbine 61b of the first exhaust turbo-supercharger 61 (the same holds true hereinafter)).

Note that it may also be possible to detect the presence of the switch request when the level of acceleration requested of the engine 1 is higher than a predetermined value. The level of requested acceleration corresponds to, e.g., a variation in the increasing direction of the accelerator opening degree or a change speed in the increasing direction of the acceleration opening degree. The predetermined value may be set appropriately to such a value as to cause a shift from the position in the first operation region to a position in the second operation region in the control map.

Figure 3:
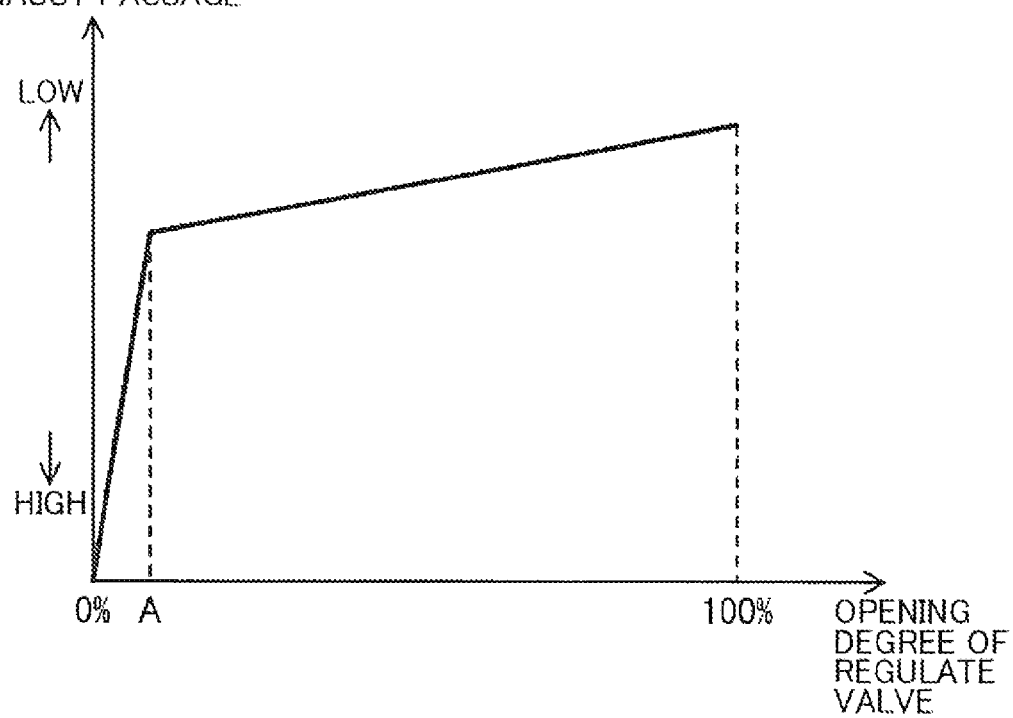
FIG. 3 is a graph showing a relationship between the opening degree of a regulate valve and the pressure in an exhaust passage.

The pressure reducing operation is an operation of controlling, when the presence of the switch request is detected, the opening degree of the regulate valve 68 to an opening degree larger than when the first valve characteristic is selected. In the present embodiment, the opening degree of the regulate valve 68 is basically 0% (at the full-closed position), and is also 0% even when the first valve characteristic is selected. When the presence of the switch request is detected, the opening degree of the regulate valve 68 is increased from 0% to a predetermined opening degree. Here, the relationship between the opening degree of the regulate valve 68 and the pressure in the exhaust passage 40 is shown in FIG. 3. If the regulate valve 68 is opened to A %, the pressure in the exhaust passage 40 can be sufficiently reduced. Accordingly, the predetermined opening degree may be set appropriately to about A % (e.g., 10% to 20%). Note that the opening degree of the intake bypass valve 65 is also basically 0% (at the full-closed position). Even when the opening degree of the regulate valve 68 reaches the predetermined opening degree, the opening degree of the intake bypass valve 65 stays at 0% and, even when the opening degree of the regulate valve 68 changes from the predetermined opening degree to 0%, the opening degree of the intake bypass valve 65 stays at 0%.

The control unit 100 also controls, when a predetermined time T has elapsed from the time when the presence of the switch request is detected, the opening degree of the regulate valve 68 from the predetermined opening degree (A %) during the pressure reducing operation to an opening degree (which is 0% in the present embodiment) smaller than that. The predetermined time T is a time slightly shorter than the time from the initiation of switching by the variable valve mechanism 18 (switching actuator) to the completion of the switching (time which allows an effect resulting from the pressure reducing operation to be satisfactorily obtained and allows the first exhaust turbo-supercharger 61 to achieve satisfactory supercharging performance at the time when the switching is completed). It follows therefore that the control unit 100 reduces the opening degree of the regulate valve 68 before the switching from the first valve characteristic to the second valve characteristic by the variable valve mechanism 18 (switching actuator) is completed.

The control unit 100 also controls, on detecting the presence of the switch request, the opening degree of the wastegate valve 70 to the same opening degree as when the first valve characteristic is selected or to an opening degree smaller than when the first valve characteristic is selected. In the present embodiment, the opening degree of the wastegate valve 70 is basically 0% (at the full-closed position), and is also 0% when the first valve characteristic is selected. On detecting the presence of the switch request, the control unit 100 controls the opening degree of the wastegate valve 70 to 0%, which is the same as when the first valve characteristic is selected. This is for promoting the supercharging by the second exhaust turbo-supercharger 62 since, when the opening degree of the regulate valve 68 is set to the predetermined opening degree, the first exhaust turbo-supercharger 61 cannot achieve satisfactory supercharging performance any more.

FIG. 4 shows an operation of controlling the intake throttle valve 37, the hot EGR valve 53, the regulate valve 68, and the wastegate valve 70 when the presence of the switch request is detected in the control unit 100.

In Step S1, the opening degree of the regulate valve 68 is set to the predetermined opening degree, and the opening degree of the intake throttle valve 37 is set to 100% (a full-open position). This is for ensuring an amount of fresh air charged into the cylinder 2 even in a situation where the first exhaust turbo-supercharger 61 cannot achieve satisfactory supercharging performance any more.

Next, in Step S2, the hot EGR valve 53 is controlled to be more open than when the first valve characteristic is selected. If it is assumed here that the first valve characteristic is selected in the low-rotation and low-load operation region during the engine cold period, according to the first valve characteristic, the cold EGR valve 54 is in a full-closed state, and the hot EGR valve 53 is in an opened state. The opening degree of the hot EGR valve 53 is controlled such that the concentration of intake oxygen inhaled into each of the cylinders 2 has a predetermined target value. When the presence of the switch request is detected, the predetermined target value is increased. At this time, if the opening degree of the regulate valve 68 is not set to the predetermined opening degree but is held at 0%, the opening degree of the hot EGR valve 53 is reduced (see the two-dot-dash line in the section "Opening Degree of Hot EGR Valve" of FIG. 5). However, actually, the opening degree of the regulate valve 68 is set to the predetermined opening degree so that the pressure difference between the exhaust passage 40 and the intake passage 30 decreases, and an external EGR amount decreases accordingly. Therefore, even when the target value is increased, the opening degree of the hot EGR valve 53 is consequently increased.

Next, in Step S3, it is determined whether or not the predetermined time T has elapsed from the time when the presence of the switch request is detected. When the determination results in NO, the processing operation in Step S3 is repeated. When the determination in Step S3 results in YES, the process flow advances to Step S4 to bring the regulate valve 68 into the full-closed state. Next, in Step S5, to maintain the predetermined target value which is increased as a result of bringing the regulate valve 68 into the full-closed state, the opening degree of the hot EGR valve 53 is reduced.

FIG. 5 is a timing chart showing variations in the intake throttle valve 37, the hot EGR valve 53, the regulate valve 68, the wastegate valve 70, target torque, real torque, the amount of air charge, and the pressure in the exhaust passage 40 resulting from the control by the control unit 100. Note that, in FIG. 5, in each of the sections "Real Torque", "Opening Degree of Hot EGR Valve", "Amount of Air Charge", and "Pressure in Exhaust Passage", the line shown as the two-dot-dash line corresponds to the case where the opening degree of the regulate valve 68 is held at 0% when the presence of the switch request is detected.

Before the time t1, the operating state of the engine 1 is in the predetermined operation region, and the valve characteristic is the first valve characteristic. It is assumed that, at the time t1, the target torque abruptly increases, and the presence of the request for switching to the second valve characteristic resulting from an increase in engine load is detected.

By the detection, the amount of the fuel supplied by the injector 20 to the combustion chamber 6 is increased, and the switching from the first valve characteristic to the second valve characteristic by the variable valve mechanism 18 (switching actuator) is initiated. The switching is completed at a time t2.

Also, by the detection, the opening degree of the regulate valve 68 is shifted from 0% (the full-closed position) to the predetermined opening degree, and the opening degree of the intake throttle valve 37 is set to 100% (the full-open position). The opening degree of the wastegate valve 70 stays at 0% (the full-closed position), and supercharging by the second exhaust turbo-supercharger 62 is fully performed. In addition, the opening degree of the hot EGR valve 53 is increased to be larger than when the first valve characteristic is selected.

Mainly by the supercharging by the second exhaust turbo-supercharger 62 and the full-opening of the intake throttle valve 37, the amount of air charge (fresh air plus external EGR gas) into the cylinder 2 increases (the concentration of intake oxygen is set to the predetermined target value). Then, with the increase in the amount of the fuel, the real torque increases.

By the increase in the amount of charge and the increase in the amount of the fuel, the pressure in the exhaust passage 40 is increased to a value larger than when the first valve characteristic is selected. Here, when the presence of the switch request is detected, if the opening degree of the regulate valve 68 is held at 0%, the pressure in the exhaust passage 40 increases to a value shown by the two-dot-dash line in the section "Pressure in Exhaust Passage" of FIG. 5. However, by setting the opening degree of the regulate valve 68 to the predetermined opening degree, the pressure in the exhaust passage 40 drops from the value shown by the two-dot-dash line to the value shown by the solid line. The pressure drop causes a reduction in the amount of the burnt gas introduced from the exhaust passage 40 into each of the cylinders 2 in the intake stroke, i.e., the internal EGR amount, and allows the amount of fresh air charged into the cylinder 2 to be increased at an earlier time than when the opening degree of the regulate valve 68 is held at 0% (see the line shown as the two-dot-dash line in the section "Amount of Air Charge" of FIG. 5). Consequently, the real torque rises at an earlier time than when the opening degree of the regulate valve 68 is held at 0% (see the line shown as the two-dot-dash line in the section "Real Torque" of FIG. 5) to improve the response to the acceleration request.

Note that, even when the first valve characteristic is a characteristic which allows the intake valve 14 to be pre-opened during the exhaust stroke prior to the valve opening time in the intake stroke and the second valve characteristic is a characteristic which does not allow the pre-opening of the intake valve 14 to be performed during the exhaust stroke, the reduction in the pressure in the exhaust passage 40 causes a reduction in internal EGR amount. This is because, when the pressure in the exhaust passage 40 drops, the burnt gas is likely to flow in the exhaust passage 40 in the exhaust stroke to reduce the amount of the burnt gas introduced into the intake passage 30.

When the predetermined time T (T<t2−t1) has elapsed from the time of the switch request, the opening degree of the regulate valve 68 becomes 0% again and, correspondingly, the opening degree of the hot EGR valve 53 decreases.

As a result of the opening degree of the regulate valve 68 becoming 0%, as shown by the solid line in the section "Pressure in Exhaust Passage" of FIG. 5, the pressure in the exhaust passage 40 abruptly rises and, at the time t2 when the switching from the first valve characteristic to the second valve characteristic is completed, the pressure in the exhaust passage 40 becomes generally the same as the value shown by the two-dot-dash line. As a result, at the time t2, the first exhaust turbo-supercharger 61 becomes capable of providing satisfactory supercharging performance.

At the time t2 and thereafter also, the pressure in the exhaust passage 40 continues to rise, and the amount of air charge and the real torque also continue to rise so that, at a time t3, the real torque reaches the target torque.

As described heretofore, in the present embodiment, the control unit 100 constitutes a switch request detecting unit, a fuel amount increasing unit, a valve characteristic switching unit, an exhaust pressure reducing unit, a first-exhaust-bypass-valve control unit, and a second-exhaust-bypass-valve control unit each according to the present invention.

Therefore, in the present embodiment, when the valve characteristic is the first valve characteristic and when the presence of the request for switching to the second valve characteristic resulting from an increase in engine load is detected by the control unit 100, the control unit 100 controls, as the pressure reducing operation for reducing the pressure in the exhaust passage 40 of the engine 1, the opening degree of the regulate valve 68 to an opening degree (the predetermined opening degree) larger than when the first valve characteristic is selected. Therefore, during the switching from the first valve characteristic to the second valve characteristic by the variable valve mechanism 18, it is possible to reduce the pressure in the exhaust passage 40 and decrease the internal EGR amount, and consequently increase the amount of fresh air charged into each of the cylinders 2. In addition, merely by slightly opening the regulate valve 68 from the full-closed position, it is possible to relatively greatly reduce the pressure in the exhaust passage 40. Therefore, when the valve characteristic is switched from the first valve characteristic to the second valve characteristic, the amount of fresh air charged into the cylinder 2 can be increased at an early time. Even when the first exhaust turbo-supercharger 61 cannot provide satisfactory supercharging performance any more due to the increased opening degree of the regulate valve 68, since the opening degree of the wastegate valve 70 is not increased (maintained at the full-closed position), it becomes possible to promote the supercharging by the second exhaust turbo-supercharger 62.

In addition, when the predetermined time T has elapsed from the time of the switch request, by setting the regulate valve 68 to the full-closed position again, the first exhaust turbo-supercharger 61 becomes capable of providing satisfactory supercharging performance at the time t2.

The present invention is not limited to the above embodiment, and the above embodiment can be substituted within the scope not departing from the gist of claims.

The embodiment is only illustrative, and the scope of the invention should not be construed limitative. The scope of the present invention is defined by claims, and modifications and changes belonging to the equivalent scope of claims are all within the scope of the present invention.

Overview of the invention of the present application will be summarized as follows.

In accordance with the arrangement described above, during the switching from the first valve characteristic to the second valve characteristic, the pressure reducing operation by the pressure reducing unit allows a reduction in internal EGR amount. That is, the internal EGR amount resulting from the re-opening of the exhaust valve in the intake stroke depends on the pressure in the exhaust passage and, if the amount of lift of the exhaust valve and a valve opening period (valve opening initiation time and valve closing completion time) are the same, the internal EGR amount is smaller when the pressure in the exhaust passage is low than when it is high. As for the internal EGR amount resulting from the pre-opening of the intake valve during the exhaust stroke, it also depends on the exhaust pressure, and the internal EGR amount is smaller when the pressure in the exhaust passage is low than when it is high. Accordingly, with the pressure reducing operation by the pressure reducing unit, it is possible to reduce the internal EGR amount, and thereby increase the amount of fresh air charged into a cylinder. Therefore, when the valve characteristic is switched from the first valve characteristic to the second valve characteristic, the amount of fresh air charged into the cylinder can be increased at an early time.

Preferably, the engine control device further includes: a first exhaust turbo-supercharger having a compressor disposed in an intake passage of the engine and a turbine disposed in the exhaust passage; a first exhaust bypass passage bypassing the turbine of the first exhaust turbo-supercharger; a first exhaust bypass valve disposed in the first exhaust bypass passage; and a first-exhaust-bypass-valve control unit for controlling an opening degree of the first exhaust bypass valve, wherein the exhaust pressure reducing unit is formed of the first-exhaust-bypass-valve control unit, and the pressure reducing operation by the exhaust pressure reducing unit is an operation of controlling, when the presence of the switch request is detected by the switch request detecting unit, the opening degree of the first exhaust bypass valve to an opening degree larger than when the first valve characteristic is selected.

This allows the pressure reducing operation to be easily and reliably performed. In addition, when, e.g., the first exhaust bypass valve is set to a full-closed position during the selection of the first valve characteristic and the presence of the switch request is detected, merely by slightly opening the first exhaust bypass valve from the full-closed position, it is possible to relatively greatly reduce the pressure in the exhaust passage. Accordingly, the amount of fresh air charged into the cylinder can be increased at an early time.

Preferably, the engine control device including the first exhaust turbo-supercharger described above further includes: a second exhaust turbo-supercharger having a compressor disposed upstream of the compressor of the first exhaust turbo-supercharger in the intake passage and a turbine disposed downstream of the turbine of the first exhaust turbo-supercharger in the exhaust passage; a second exhaust bypass passage bypassing the turbine of the second exhaust turbo-supercharger; a second exhaust bypass valve disposed in the second exhaust bypass passage; and a second-exhaust-bypass-valve control unit for controlling an opening degree of the second exhaust bypass valve, wherein the second-exhaust-bypass-valve control unit controls, when the presence of the switch request is detected by the switch request detecting unit, the opening degree of the second exhaust bypass valve to the same opening degree as when the first valve characteristic is selected or to an opening degree smaller than when the first valve characteristic is selected.

In accordance with the arrangement, even when the opening degree of the first exhaust bypass valve is increased as a result of the pressure reducing operation by the pressure reducing unit, and the first exhaust turbo-supercharge cannot provide satisfactory supercharging performance any more, the opening degree of the second exhaust bypass valve is not increased (which is normally maintained at the full-closed position). Therefore, it is possible to promote supercharging by the second exhaust turbo-supercharger.

Preferably, the first-exhaust-bypass-valve control unit controls, before the switching from the first valve characteristic to the second valve characteristic by the variable valve mechanism is completed, the opening degree of the first exhaust bypass valve to an opening degree smaller than the opening degree during the pressure reducing operation.

In accordance with the arrangement, at the time when the switching from the first valve characteristic to the second valve characteristic by the variable valve mechanism is completed, the first exhaust turbo-supercharger becomes capable of providing satisfactory supercharging performance. Note that, preferably, the timing of reducing the opening degree of the first exhaust bypass valve is a timing which allows an effect resulting from the pressure reducing operation to be satisfactorily obtained and also allows the first exhaust turbo-supercharger to provide satisfactory supercharging performance at the time when the switching is completed, and which is a timing slightly before the completion of the switching.

In the engine control device, the switch request detecting unit preferably detects the presence of the switch request when a level of acceleration requested of the engine is higher than a predetermined value.

When the level of requested acceleration is thus higher than the predetermined value, it is possible to increase the amount of fresh air charged into the cylinder at an early time to allow an improvement in response to the acceleration request, and allow the function/effect of the present invention to be effectively achieved.

The present invention also provides a control device intended for an engine including a variable valve mechanism capable of switching a valve characteristic to a first valve characteristic according to which at least one of an operation of pre-opening an intake valve during an exhaust stroke prior to a valve opening time in an intake stroke and an operation of re-opening an exhaust valve during the intake stroke subsequently to the opening/closing thereof during the exhaust stroke is performed, and to a second valve characteristic according to which neither the pre-opening of the intake valve nor the re-opening of the exhaust valve is performed. The control device includes a first exhaust turbo-supercharger having a compressor disposed in an intake passage of the engine and a turbine disposed in an exhaust passage thereof; a first exhaust bypass passage bypassing the turbine of the first exhaust turbo-supercharger; a first exhaust bypass valve disposed in the first exhaust bypass passage; a first-exhaust-bypass-valve control unit for controlling an opening degree of the first exhaust bypass valve; a second exhaust turbo-supercharger having a compressor disposed upstream of the compressor of the first exhaust turbo-supercharger in the intake passage and a turbine disposed downstream of the turbine of the first exhaust turbo-supercharger in the exhaust passage; a second exhaust bypass passage bypassing the turbine of the second exhaust turbo-supercharger; a second exhaust bypass valve disposed in the second exhaust bypass passage; a second-exhaust-bypass-valve control unit for controlling an opening degree of the second exhaust bypass valve; a switch request detecting unit for detecting, when the valve characteristic provided by the variable valve mechanism is the first valve characteristic, the presence or absence of a request for switching to the second valve characteristic resulting from an increase in engine load; a fuel amount increasing unit for increasing, when the presence of the switch request is detected by the switch request detecting unit, an amount of fuel supplied to the engine to an amount larger than when the first valve characteristic is selected; and a valve characteristic switching unit for switching, when the presence of the switch request is detected by the switch request detecting unit, the valve characteristic provided by the variable valve mechanism from the first valve characteristic to the second valve characteristic. The first-exhaust-bypass-valve control unit controls, when the presence of the switch request is detected by the switch request detecting unit, the opening degree of the first exhaust bypass valve to an opening degree larger than when the first valve characteristic is selected, and the second-exhaust-bypass-valve control unit controls, when the presence of the switch request is detected by the switch request detecting unit, the opening degree of the second exhaust bypass valve to the same opening degree as when the first valve characteristic is selected or to an opening degree smaller than when the first valve characteristic is selected.

In accordance with the arrangement, when the presence of the switch request is detected, the opening degree of the first exhaust bypass valve is increased to be larger than when the first valve characteristic is selected. Therefore, during the switching from the first valve characteristic to the second valve characteristic, it is possible to reduce the pressure in the exhaust passage and decrease the internal EGR amount, and consequently increase the amount of fresh air charged into a cylinder. For example, when the first exhaust bypass valve is set to a full-closed position during the selection of the first valve characteristic and the presence of the switch request is detected, merely by slightly opening the first exhaust bypass valve from the full-closed position, it is possible to relatively greatly reduce the pressure in the exhaust passage. Therefore, the amount of fresh air charged into the cylinder can be increased at an early time when the valve characteristic is switched from the first valve characteristic to the second valve characteristic. Moreover, even when the first exhaust turbo-supercharger cannot provide satisfactory supercharging performance any more due to the increased opening degree of the first exhaust bypass valve, the opening degree of the second exhaust bypass valve is not increased (which is normally maintained at the full-closed position). Therefore, it is possible to promote supercharging by the second exhaust turbo-supercharger.

The present invention also provides a control method intended for an engine including a variable valve mechanism capable of switching a valve characteristic to a first valve characteristic according to which at least one of an operation of pre-opening an intake valve during an exhaust stroke prior to a valve opening time in an intake stroke and an operation of re-opening an exhaust valve during the intake stroke subsequently to the opening/closing thereof during the exhaust stroke is performed, and to a second valve characteristic according to which neither the pre-opening of the intake valve nor the re-opening of the exhaust valve is performed. The control method includes: a first step of detecting, when the valve characteristic provided by the variable valve mechanism is the first valve characteristic, the presence or absence of a request for switching to the second valve characteristic resulting from an increase in engine load; a second step of increasing, when the presence of the switch request is detected in the first step, an amount of fuel supplied to the engine to an amount larger than when the first valve characteristic is selected; a third step of switching, when the presence of the switch request is detected in the first step, the valve characteristic provided by the variable valve mechanism from the first valve characteristic to the second valve characteristic; and a fourth step of performing, when the presence of the switch request is detected in the first step, a pressure reducing operation for reducing a pressure in an exhaust passage of the engine.

The invention claimed is:

1. An engine comprising:
    a variable valve mechanism capable of switching a valve characteristic to a first valve characteristic according to which at least one of an operation of pre-opening an intake valve during an exhaust stroke prior to a valve opening time in an intake stroke and an operation of re-opening an exhaust valve during the intake stroke subsequently to the opening/closing thereof during the exhaust stroke is performed, and to a second valve characteristic according to which neither the pre-opening of the intake valve nor the re-opening of the exhaust valve is performed;

an exhaust turbo-supercharger having a compressor disposed in an intake passage of the engine and a turbine disposed in the exhaust passage;
an exhaust bypass passage bypassing the turbine of the exhaust turbo-supercharger;
an exhaust bypass valve disposed in the exhaust bypass passage;
an exhaust-bypass-valve control unit for controlling an opening degree of the exhaust bypass valve;
a switch request detecting unit for detecting, when the valve characteristic provided by the variable valve mechanism is the first valve characteristic, the presence or absence of a request for switching to the second valve characteristic resulting from an increase in engine load;
a fuel amount increasing unit for increasing, when the presence of the switch request is detected by the switch request detecting unit, an amount of fuel supplied to the engine to an amount larger than when the first valve characteristic is selected; and
a valve characteristic switching unit for switching, when the presence of the switch request is detected by the switch request detecting unit, the valve characteristic provided by the variable valve mechanism from the first valve characteristic to the second valve characteristic, wherein
the exhaust-bypass-valve control unit controls, when the presence of the switch request is detected by the switch request detecting unit, the opening degree of the exhaust bypass valve to an opening degree larger than when the first valve characteristic is selected, and then decreases the opening degree of the exhaust bypass valve before the switching from the first valve characteristic to the second valve characteristic by the variable valve mechanism is completed.

2. The engine according to claim 1, further comprising:
an additional exhaust turbo-supercharger having a compressor disposed upstream of the compressor of the exhaust turbo-supercharger in the intake passage and a turbine disposed downstream of the turbine of the exhaust turbo-supercharger in the exhaust passage;
an additional exhaust bypass passage bypassing the turbine of the additional exhaust turbo-supercharger;
an additional exhaust bypass valve disposed in the additional exhaust bypass passage; and
an additional exhaust-bypass-valve control unit for controlling an opening degree of the additional exhaust bypass valve, wherein
the additional exhaust-bypass-valve control unit controls, when the presence of the switch request is detected by the switch request detecting unit, the opening degree of the additional exhaust bypass valve to the same opening degree as when the first valve characteristic is selected or to an opening degree smaller than when the first valve characteristic is selected.

3. The engine according to claim 2, wherein the switch request detecting unit detects the presence of the switch request when a level of acceleration requested of the engine is higher than a predetermined value.

4. The engine according to claim 1, wherein the switch request detecting unit detects the presence of the switch request when a level of acceleration requested of the engine is higher than a predetermined value.

* * * * *